J. BITTNER.
TONGS.
APPLICATION FILED AUG. 15, 1911.
1,026,488. Patented May 14, 1912.
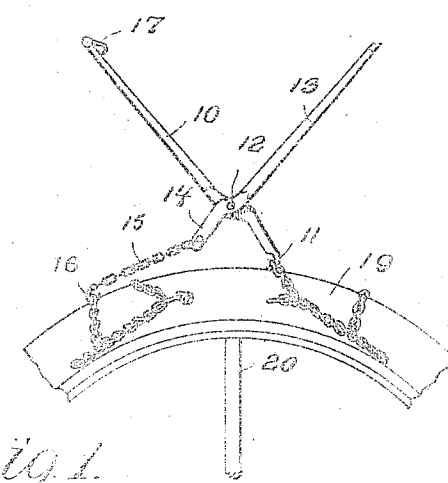
Fig. 1.
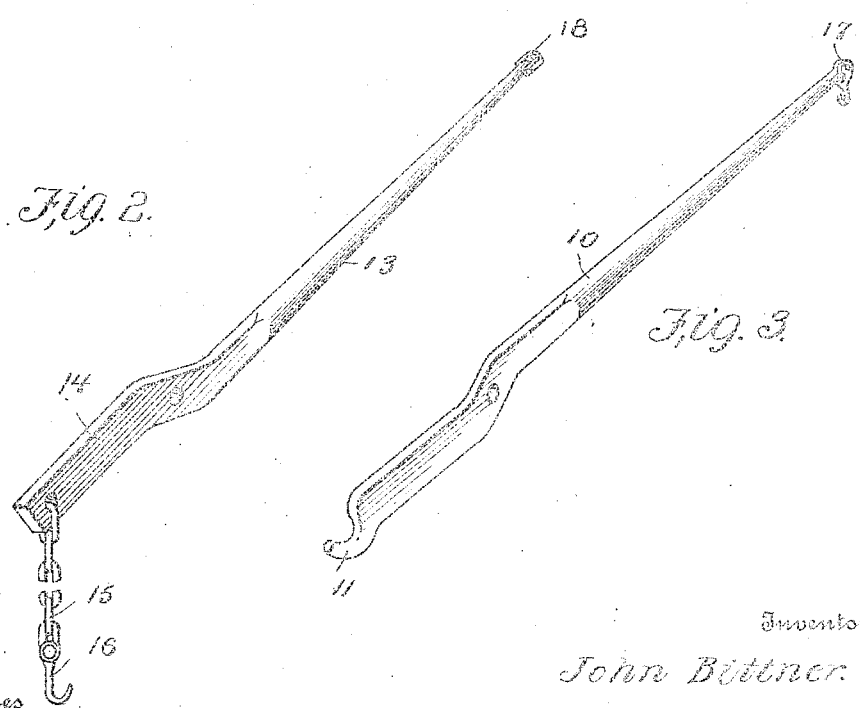
Witnesses
William R. Smith
Inventor
John Bittner.
By Victor J. Evans
Attorney

UNITED STATES PATENT OFFICE.

JOHN BITTNER, OF NEWCASTLE, INDIANA.

TONGS.

1,026,488.  Specification of Letters Patent.  Patented May 14, 1912.

Application filed August 15, 1911. Serial No. 644,155.

*To all whom it may concern:*

Be it known that I, JOHN BITTNER, a citizen of the United States, residing at Newcastle, in the county of Henry and State of Indiana, have invented new and useful Improvements in Tongs, of which the following is a specification.

An object of the invention is to provide a pair of tongs, more particularly adapted for use in connecting the ends of tire chains and the like.

For the purpose mentioned, use is made of a handle provided with an offset hook, a second handle provided with an offset shank and pivotally mounted on the first mentioned handle, a chain extended from the second mentioned handle and a hook mounted on the extremity of the said chain, means being mounted on one of the handles for removably locking the other handle therewith.

Reference is to be had to the accompanying drawings constituting a part of this specification in which similar characters of reference denote corresponding parts in all the views, and in which—

Figure 1 is a side elevation of my device showing the same in applied position. Fig. 2 is a perspective view of one of the members of my device. Fig. 3 is a perspective view of the other member of my device.

Referring more particularly to the views, I provide a handle 10 provided at one end with a hook 11 offset from the longitudinal axis of the handle 10 and pivotally mounted at a point 12; between the inner end of the hook 11 and the handle 10 is a second handle 13 provided with an offset shank 14 to which is pivotally connected a chain 15 having a hook 16 mounted to swing at the outer end thereof. At the lower end of the handle 10 a hooked bar 17 is pivotally mounted and adapted to engage an end of the handle 13, having a recessed portion 18, to releasably retain the lower end of the handle 13 in engagement with the lower end of the handle 10.

In the use of my device for positioning tire chains on a tire 19 of a wheel 20, the tire chain is first stretched around the tire and the hook 11 is then engaged with an end of the tire chain, the hook 16 being engaged with the tire chain a distance from the other end thereof, it being understood that the handles 10 and 13 are now in their greatest spaced relation. Now by exerting pressure on the handles 10 and 13 to move the lower ends thereof together, the ends of the chain will be pulled up on the tire so that the mentioned ends can be connected, the hooked bar 17 being engaged with the lower end of the handle 13 in the recessed portion 18 to retain the handles 10 and 13 in engagement, while the ends of the tire chain are connected.

Although I have shown and described my device as used in connection with tire chains, it will be understood that the tongs can be used for various other purposes, the scope of the invention being defined in the appended claims.

Having thus fully described the invention, what I claim as new, is:—

1. A pair of tongs comprising a handle, an offset hook formed at one end of the said handle, a second handle pivotally mounted on the first handle, an offset shank formed on the second handle, a chain pivotally connected with the said offset shank, a hook mounted to swing on the outer end of the said chain and means for releasably retaining the said handle in engagement.

2. In a pair of tongs a handle, an offset hook formed at one end of the said handle, a second handle pivotally mounted on the first handle, an offset shank formed on the second handle, a chain pivotally mounted on the said offset shank and a hook mounted to swing on the outer end of the said chain.

3. In a pair of tongs the combination of a plurality of pivotally connected handles, a hook formed on one of the said handles and gripping means connected to an end of the other said handle and spaced a distance therefrom.

In testimony whereof I affix my signature in presence of two witnesses.

JOHN BITTNER.

Witnesses:
ERNEST DUNCAN,
O. F. SEAGAR.